(12) United States Patent
Amano et al.

(10) Patent No.: US 10,428,735 B2
(45) Date of Patent: Oct. 1, 2019

(54) JET ENGINE

(71) Applicant: IHI Corporation, Koto-ku (JP)

(72) Inventors: Shinichi Amano, Tokyo (JP); Yuusaku Oikawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 280 days.

(21) Appl. No.: 15/446,566

(22) Filed: Mar. 1, 2017

(65) Prior Publication Data

US 2017/0191416 A1 Jul. 6, 2017

Related U.S. Application Data

(63) Continuation of application No. PCT/JP2015/074278, filed on Aug. 27, 2015.

(30) Foreign Application Priority Data

Nov. 14, 2014 (JP) .................. 2014-231565

(51) Int. Cl.
*F02C 7/06* (2006.01)
*F01D 5/02* (2006.01)
(Continued)

(52) U.S. Cl.
CPC .......... *F02C 7/06* (2013.01); *F01D 5/02* (2013.01); *F01D 5/026* (2013.01); *F01D 5/085* (2013.01);
(Continued)

(58) Field of Classification Search
CPC ...... F02C 7/06; F02C 3/02; F02C 7/00; F01D 5/085; F01D 5/026; F01D 25/00;
(Continued)

(56) References Cited

U.S. PATENT DOCUMENTS 2,636,665 A * 4/1953 Lombard ................. F01D 5/08
415/115
2,788,951 A 4/1957 Flint
(Continued)

FOREIGN PATENT DOCUMENTS

JP 5-92572 U 12/1993
JP 2000-55199 2/2000
(Continued)

OTHER PUBLICATIONS

International Search Report dated Dec. 1, 2015 in PCT/JP2015/074278 filed on Aug. 27, 2015 (with English translation).

*Primary Examiner* — Greg Binda
(74) *Attorney, Agent, or Firm* — Oblon, McClelland, Maier & Neustadt, L.L.P.

(57) ABSTRACT

A jet engine, which includes a hollow shaft, a center bent tube which is inserted into the shaft, an annular support portion which protrudes from an inner wall surface of the shaft, and an annular spacer ring which is provided on an outer wall surface of the center bent tube and slidably abuts on the support portion, is provided. The spacer ring includes an outer circumferential surface which has a shape along a surface of the support portion in an axial direction of the shaft, an inner circumferential surface which has a shape along the outer wall surface of the center bent tube in the axial direction of the shaft, and a cut portion in which a portion of the spacer ring is cut.

5 Claims, 3 Drawing Sheets

(51) Int. Cl.
 *F01D 25/00* (2006.01)
 *F02C 7/00* (2006.01)
 *F16C 3/02* (2006.01)
 *F01D 5/08* (2006.01)

(52) U.S. Cl.
 CPC ............... *F01D 25/00* (2013.01); *F02C 7/00* (2013.01); *F16C 3/02* (2013.01); *F05D 2220/323* (2013.01); *F05D 2230/64* (2013.01); *F05D 2240/61* (2013.01); *Y02T 50/676* (2013.01); *Y10T 464/10* (2015.01)

(58) Field of Classification Search
 CPC ........ F01D 5/02; Y10T 464/10; Y02T 50/676; F05D 2240/61; F05D 2230/64; F05D 2220/323
 USPC ..... 464/17, 162; 384/9, 29–32, 42; 277/459, 277/465; 416/96 R; 415/115
 See application file for complete search history.

(56) References Cited

U.S. PATENT DOCUMENTS

| | | | | |
|---|---|---|---|---|
| 4,808,015 A | * | 2/1989 | Babcock | ................ F16D 23/14 384/42 |
| 5,313,865 A | * | 5/1994 | Layton | ................... B21D 28/12 384/30 |
| 6,257,590 B1 | | 7/2001 | Kumai et al. | |
| 6,360,418 B1 | | 3/2002 | Freeman et al. | |
| 2004/0025494 A1 | | 2/2004 | Vache et al. | |
| 2009/0282679 A1 | | 11/2009 | Mons et al. | |

FOREIGN PATENT DOCUMENTS

| | | |
|---|---|---|
| JP | 2004-514841 | 5/2004 |
| JP | 2009-174528 | 8/2009 |
| WO | WO 2008/082334 A1 | 7/2008 |
| WO | WO 2015/004357 A1 | 1/2015 |

\* cited by examiner

JET ENGINE

This application is a Continuation Application based on International Application No. PCT/JP2015/074278, filed on Aug. 27, 2015, which claims priority on Japanese Patent Application No. 2014-231565, filed on Nov. 14, 2014, the contents of which are incorporated herein by reference.

TECHNICAL FIELD

The present disclosure relates to a jet engine.

BACKGROUND ART

In a jet engine, a shaft is formed in a hollow shape, and a center bent tube may be provided inside the shaft. In the center bent tube, a bearing or the like which supports the shaft is connected to external air, the tip portion of the center bent tube is fixed to the shaft, and the center bent tube rotates along with the shaft.

Patent Documents 1 and 2 disclose jet engines which includes the center bent tube. Patent Documents 3 and 4 disclose a piston ring which slides on a cylinder related to sliding components disclosed in Patent Documents 1 and 2.

CITATION LIST

Patent Literature

[Patent Document 1] Japanese Unexamined Patent Application, First Publication No. 2009-174528
[Patent Document 2] Published Japanese Translation No. 2004-514841 of the PCT International Publication
[Patent Document 3] Japanese Unexamined Patent Application, First Publication No. 2000-55199
[Patent Document 4] Japanese Unexamined Utility Model Application, First Publication NO. 5-92572

SUMMARY

Technical Problem

Since a thermal deformation amount of the center bent tube and a thermal deformation amount of the shaft are different from each other, if the center bent tube is rigidly fixed to the shaft at multiple locations in the axial direction of the shaft, large stress is locally applied to the center bent tube due to thermal deformation and twist. Accordingly, in general, only the distal end of the center bent tube is rigidly fixed to the shaft. However, since the positional regulation of the center bent tube cannot be performed by support realized by only the distal end, a position regulation mechanism which slidably supports the center bent tube is provided at one location or each of multiple locations in the axial direction of the shaft.

The position regulation mechanism includes an annular support portion which is fixed to the inner wall surface of the shaft, and a spacer ring which is provided on the outer wall surface of the center bent tube and slidably abuts on the support portion. According to the position regulation mechanism, since the spacer ring can slide on the support portion, it is possible to absorb the difference between thermal deformation amounts or the like of the shaft and the center bent tube.

However, in the related art, the above-described spacer ring is formed in a ring shape which is continued over the entire region in the circumferential direction without a gap, and the spacer ring is required to be widened in the radial direction so as to be attached to the center bent tube which is long in the axial direction. Accordingly, the spacer ring of the related art is formed using a resin material having a small elastic modulus. However, in general, this material has a high friction coefficient and is easily worn. Accordingly, when the center bent tube to which the spacer ring is attached is inserted into a shaft in which the support portion is provided, the spacer ring is caught by the support portion, which becomes a hindrance for the insertion work. In addition, the spacer ring is worn due to use for a long time, centering of the center bent tube becomes insufficient, and vibrations or the like are likely to occur.

In addition, the cross section of the spacer ring of the related art is circular. However, in a case where the cross section of the spacer ring is circular and the spacer ring is formed of a resin material having a small elastic modulus, the spacer ring is interposed between the support portion and the center bent tube and is greatly deformed. Since this deformation is fluid, the spacer ring is not uniform in the circumferential direction. Accordingly, a difference of compression amounts of the spacer ring occurs in the circumferential direction of the spacer ring, and the centering of the center bent tube is likely to be insufficient.

The present disclosure is made in consideration of the above-described circumstances, and an object thereof is to easily perform an attachment operation of the center bent tube in a jet engine including the center bent tube and to more accurately perform the centering of the center bent tube.

Solution to Problem

A first aspect of the present disclosure is a jet engine which includes: a hollow shaft; a center bent tube which is inserted into the shaft; an annular support portion which protrudes from an inner wall surface of the shaft; and an annular spacer ring which is provided on an outer wall surface of the center bent tube and slidably abuts on the support portion, in which the spacer ring includes an outer circumferential surface which has a shape along a surface of the support portion in an axial direction of the shaft, an inner circumferential surface which has a shape along the outer wall surface of the center bent tube in the axial direction of the shaft, and a cut portion in which a portion of the spacer ring is cut.

In a second aspect of the present disclosure, both ends of the outer circumferential surface of the spacer ring in the axial direction of the shaft are chamfered.

In a third aspect of the present disclosure, the cut portion is linearly provided to be inclined to the axis of the shaft.

In a fourth aspect of the present disclosure, the center bent tube includes an annular accommodation groove in which the spacer ring is accommodated, and wall surfaces of the accommodation groove facing each other in the axial direction of the shaft are disposed with a gap with respect to the spacer ring.

In a fifth aspect of the present disclosure, a gap is formed between the center bent tube and the support portion.

According to the jet engine of the present disclosure, a cut portion in which a portion of the spacer ring is cut is provided. Accordingly, when the spacer ring is attached to the center bent tube, it is possible to open the spacer ring with the cut portion as a boundary. Therefore, the spacer ring can be formed of a material having a high elastic modulus, and for example, it is possible to select a hard material having wear resistance such as polytetrafluoroethylene, a polyimide resin, or the like as a material for forming the spacer ring. By using the spacer ring having the above-described material, when the center bent tube to which the spacer ring is attached is inserted into the shaft in which the support portion is provided, it is possible to prevent the spacer ring from being caught by the support portion, and it is possible to easily perform the attachment operation of the center bent tube. In addition, it is possible to prevent the spacer ring from being worn due to use for a long period of time. In addition, since the spacer ring is not easily worn and deformed, it is possible to prevent the center bent tube and the support portion from coming into contact with each other. In addition, in accordance with the jet engine according to the present disclosure, the spacer ring includes the outer circumferential surface which has a shape along the surface of the support portion in the axial direction of the shaft and the inner circumferential surface which has the shape along the outer wall surface of the center bent tube in the axial direction of the shaft. Accordingly, the spacer ring can come into contact with the support portion and the center bent tube with a wide area. Therefore, it is possible to prevent a great pressing force from being applied locally to the spacer ring which is interposed between the support portion and the center bent tube, and it is possible to uniformize a deformation amount in the circumferential direction of the spacer ring. Accordingly, it is possible to prevent a difference of compression amounts of the spacer ring in the circumferential direction from occurring, and it is possible to reliably perform centering of the center bent tube.

DESCRIPTION OF EMBODIMENTS

Hereinafter, an embodiment of a jet engine according to the present disclosure will be described with reference to the drawings. In addition, in the following drawings, the scale of each member is appropriately changed such that each member can be recognized.

Figure 1:
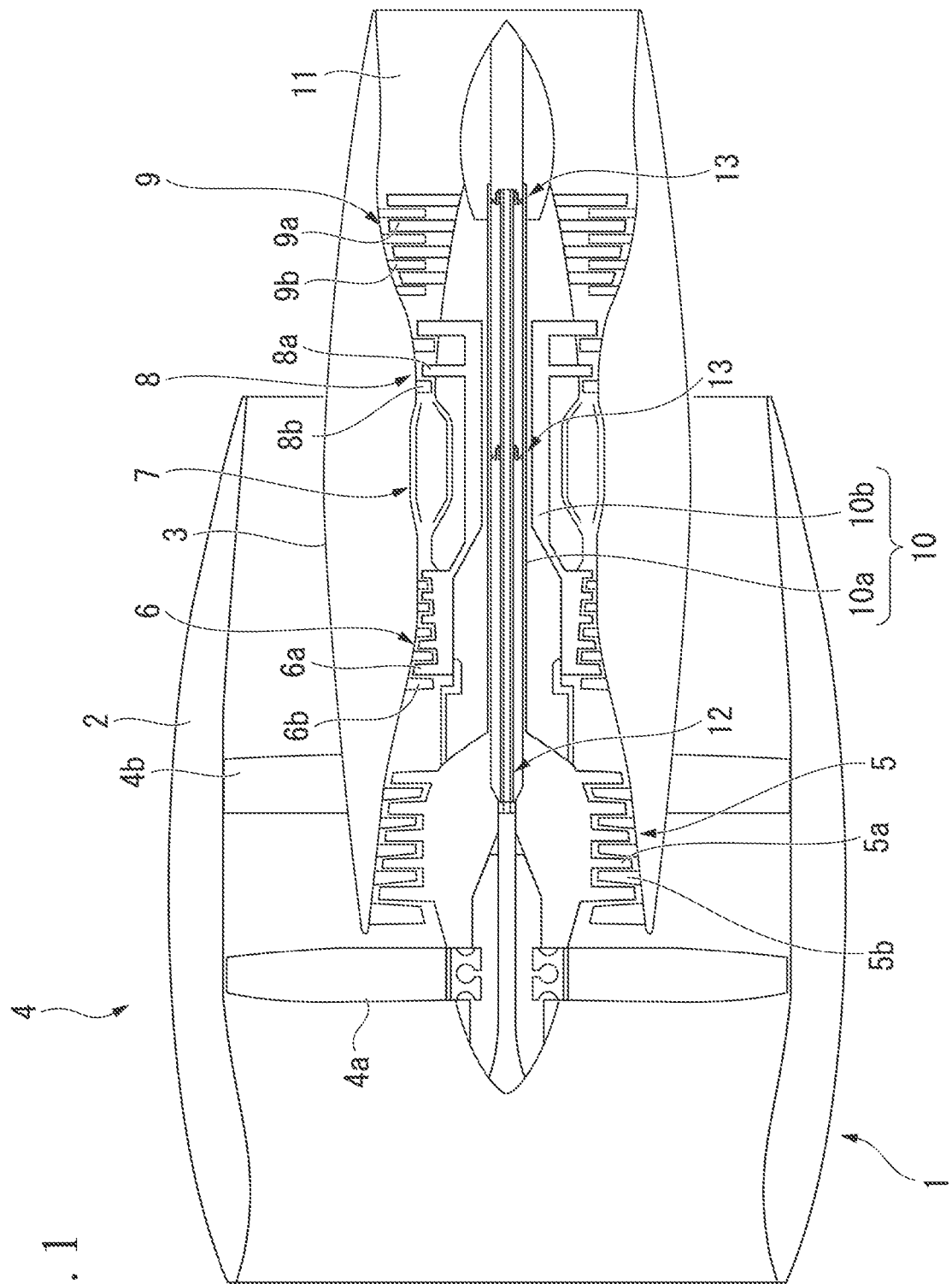
FIG. 1 is a sectional view showing a schematic configuration of a jet engine in an embodiment of the present disclosure.

FIG. 1 is a sectional view showing a schematic configuration of a jet engine 1 in an embodiment of the present disclosure. As shown in FIG. 1 the jet engine 1 of the present embodiment includes a fan cowl 2, a core cowl 3, a fan 4, a low-pressure compressor 5, a high-pressure compressor 6, a combustor 7, a high-pressure turbine 8, a low-pressure turbine 9, a shaft 10, a main nozzle 11, a center bent tube 12, and a position regulation mechanism 13.

The fan cowl 2 is a cylindrical member which is disposed on the uppermost stream side inside the jet engine 1, the upper stream end and the lower stream end of the fan cowl 2 in the flow direction of air are open ends, and the upper stream end functions as an air intake port. As shown is FIG. 1 the upper steam side of the core cowl 3 and the fan 4 are accommodated in the fan cowl 2.

The core cowl 3 is a cylindrical member having a smaller diameter than that of the fan cowl 2, and similarly to the fan cowl 2, the upper stream end and the lower stream end of the core cowl 3 in the flow direction of air are open ends. The low-pressure compressor 5, the high-pressure compressor 6, the combustor 7, the high-pressure turbine B, the low-pressure turbine 9, the shaft 10, and the like which are main portions of the jet engine 1 are accommodated in the core cowl 3.

An internal space of the fan cowl 2 in a region in which the core cowl 3 does not exist in the axial direction (right-left direction in FIG. 1) of the shaft 10 functions as a duct through which air flows and a space interposed between the fan cowl 2 and the core cowl 3 in a region in which the core cowl 3 exists in the axial direction of the shaft 10 functions as a duct through which air flows.

The inside of the core cowl 3 is a channel (hereinafter, referred to as a core channel) through which a portion of air entering the fan cowl 2 and combustion gas generated in the combustor 7 passes. As shown in FIG. 1, the fan cowl 2 and the core cowl 3 are concentrically disposed when viewed from the flow direction of air, and are disposed with a gap. The gap between the fan cowl 2 and the core cowl 3 is a bypass channel through which the remaining portion of the air entering the fan cowl 2 which does not flow into the core channel is discharged to the outside. The fan cowl 2 and the core cowl 3 are attached to an airframe of an aircraft by a pylon (not shown).

The fan 4 forms an air stream which flows into the fan cowl 2, and includes multiple fan rotor blades 4a which are fixed to the shaft 10 and multiple fan stationary blades 4b which are disposed in the bypass channel. The shaft 10 described in detail below is divided into two portions in a radial direction when viewed in the flow direction of air. More specifically, the shaft 10 is configured of a first hollow shaft 10a which is a core portion, and a second hollow shaft 10b which surrounds the first shaft 10a and is disposed outside the first shaft 10a. The fan rotor blades 4a are fixed to the first shaft 10a of the shaft 10.

As shown in FIG. 1, the low-pressure compressor 5 is disposed on the upstream of the high-pressure compressor 6, and compresses air which is fed to the core channel by the fan 4. The low-pressure compressor 5 includes rotor blades 5a which are fixed to the first shaft 10a of the shaft 10, and stationary blades 5b which are fixed to the inner wall of the core cowl 3. One-stage blade row is formed of the multiple stationary blades 5b which are annularly disposed and the multiple rotor blades 5a which are annularly disposed on the downstream of the multiple stationary blades 5b in the axial direction. The low-pressure compressor 5 is configured such that multiple-stage blade rows are arranged in the axial direction of the shaft 10.

As shown in FIG. 1, the high-pressure compressor 6 is disposed on the downstream of the low-pressure compressor 5, and further compresses the air fed from the low-pressure compressor 5 such that the air has a higher pressure. The high-pressure compressor 6 includes rotor blades 6a which are fixed to the second shaft 10b of the shaft 10, and stationary blades 6b which are fixed to the inner wall of the core cowl 3. Similarly to the low-pressure compressor 5, one-stage blade row is formed of the multiple stationary blades 6b which are annularly disposed and the multiple rotor blades 6a which are annularly disposed on the downstream of the multiple stationary blades 6b in the axial direction. The high-pressure compressor 6 is configured such that multiple-stage blade rows are arranged in the axial direction of the shaft 10.

The combustor 7 is disposed on the downstream of the high-pressure compressor 6 and combusts a mixture of the compressed air fed from the high-pressure compressor 6 and a fuel supplied from an injector (not shown) to generate a combustion gas.

The high-pressure turbine 8 is disposed on the downstream of the combustor 7, recovers rotational power from the combustion gas discharged from the combustor 7, and drives the high-pressure compressor 6. The high-pressure turbine 8 includes multiple turbine rotor blade 8a which are fixed to the second shaft 10b of the shaft 10 and multiple turbine stationary blade 8b which are fixed to the core channel, and in the high-pressure turbine 8, the combustion gas which is straightened by the turbine stationary blades 8b is received by the turbine rotor blades 8a, and the second shaft 10b is rotated.

The low-pressure turbine 9 is disposed on the downstream of the high-pressure turbine 8, further recovers the rotational power from the combustion gas passing through the high-pressure turbine 8, and drives the fan 4 and the low-pressure compressor 5. The low-pressure turbine 9 includes multiple turbine rotor blade 9a which are fixed to the first shaft 10a of the shaft 10 and multiple turbine stationary blade 9b which are fixed to the core channel, and in the low-pressure turbine 9, the combustion gas which is straightened by the turbine stationary blades 9b is received by the turbine rotor blades 9a, and the first shaft 10a is rotated.

The shaft 10 is a hollow rod-shaped member which is disposed facing the flow direction of air, and transmits the rotational power which is recovered by the turbine (high-pressure turbine 8 and low-pressure turbine 9) to the fan 4 and the compressor (low-pressure compressor 5 and high-pressure compressor 6). As described above, the shaft 10 is divided into two portions in the radial direction, and is formed of the first shaft 10a and the second shaft 10b. The rotor blades 5a of the low-pressure compressor 5 and the fan rotor blade 4a of the fan 4 are attached to the upstream side of the first shaft 10a, and the turbine rotor blades 9a of the low-pressure turbine 9 is attached to the downstream side of the first shaft 10a. The rotor blades 5a of the high-pressure compressor 6 are attached to the upstream side of the second shaft 10b, and the turbine rotor blades 8a of the high-pressure turbine 8 are attached to the downstream side of the second shaft 10b.

The main nozzle 11 is provided on the downstream of the low-pressure turbine 9, and ejects the combustion gas passing through the low-pressure turbine 9 toward the rear side of the jet engine 1. A thrust of the jet engine 1 is obtained by a reaction when the combustion gas is ejected from the main nozzle 11.

The center bent tube 12 is a pipe member which is linearly long in the axial direction of the shaft 10, and is inserted into the first shaft 10a. The distal end of the center bent tube 12 is fixed to the first shaft 10a by a screw (not shown) formed at the distal end of the center bent tube 12 being screwed to the first shaft 10a, and rotates with the axis of the shaft 10 as a center along with the rotation of the first shaft 10a. The center bent tube 12 discharges air including a lubricant to the main nozzle 11 side.

Figure 2:
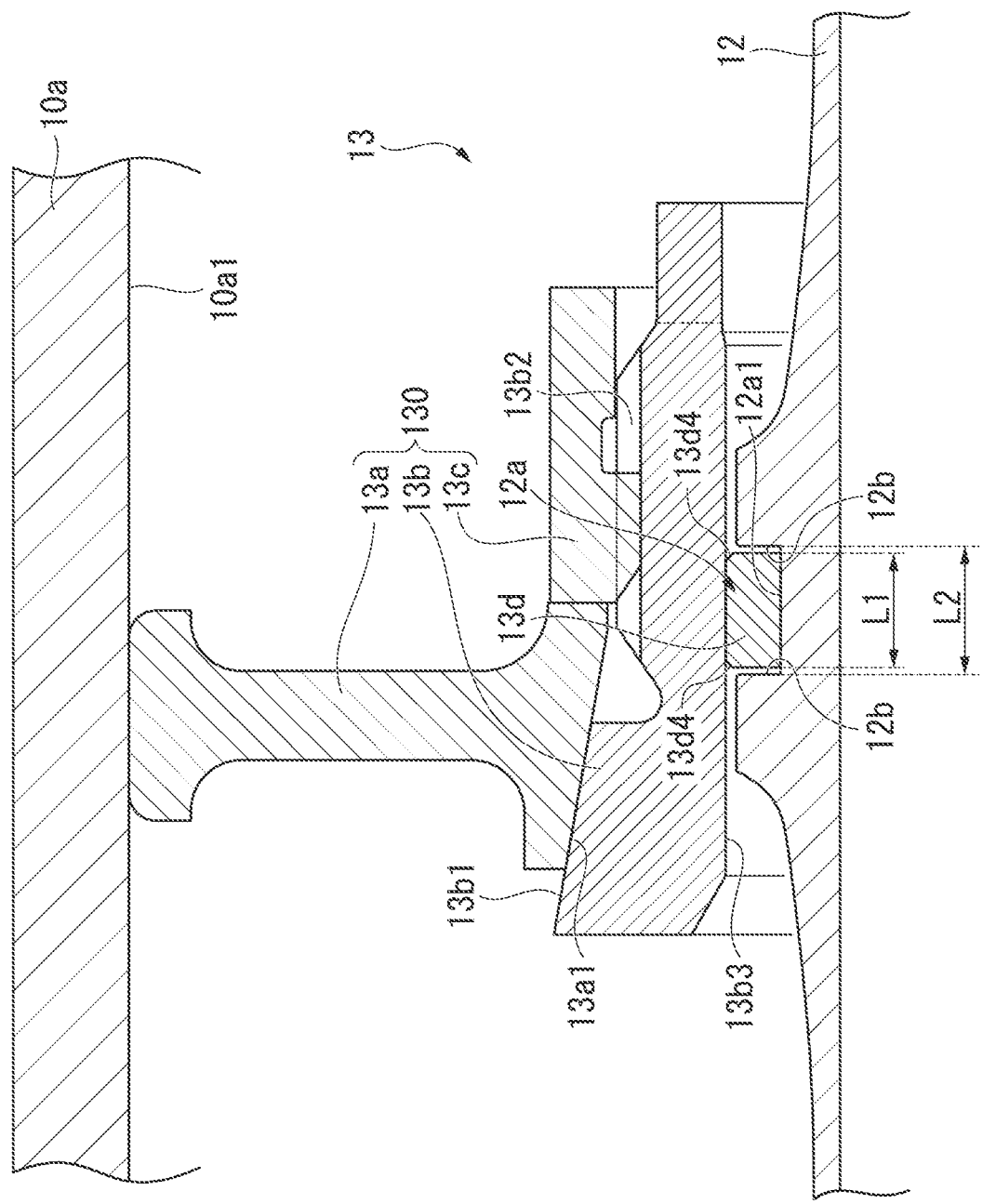
FIG. 2 is a partially enlarged view including a portion of a center bent tube and a position regulation mechanism included in the jet engine in the embodiment of the present disclosure.

FIG. 2 is a partially enlarged view including a portion of the center bent tube 12 and the position regulation mechanism 13. As shown in FIG. 2, an accommodation groove 12a for accommodating a spacer ring 13d described below is annularly provided on the outer circumferential surface of the center bent tube 12. The accommodation groove 12a has a width L2 which is wider than a width L1 of the spacer ring 13d in the axial direction of the shaft 10. Accordingly, as shown in FIG. 2, wall surfaces 12b facing each other are disposed with a gap with respect to the spacer ring 13d. The spacer ring 13d is provided in the accommodation groove 12a of the center bent tube 12. That is, the spacer ring 13d is provided on an outer wall surface 12a1 of the center bent tube 12.

As shown in FIG. 1, in the present embodiment, the position regulation mechanisms 13 slidably support two locations of the center portion of the center bent tube 12 and the rear end portion thereof. As shown in FIG. 2, each of the position regulation mechanisms 13 includes a support ring 13a, a sleeve 13b, a nut 13c and the spacer ring 13d. The support ring 13a, the sleeve 13b, and the nut 13c configure a support portion 130 of the present disclosure, and the entire support portion 130 becomes an annular member which protrudes from the inner wall surface 10a1 of the first shaft 10a toward the inside. The support ring 13a is an annular member which is interposed between the sleeve 13b and the inner wall surface 10a1 of the first shaft 10a so as to be supported. The inner circumferential surface of the support ring 13a which abuts on the sleeve 13b is a taper surface 13a1 in which the inner diameter of the inner circumferential surface of the support ring 13a decreases toward the nut 13c. The sleeve 13b is a tubular member which is inserted into the center opening of the support ring 13a. A taper surface 13b1 which is inclined at the same angle as that of the taper surface 13a1 of the support ring 13a is formed on the front end portion (left end portion in FIG. 2) of the sleeve 13b.

A screw thread 13b2 to which the nut 13c is screwed is formed on the rear end portion (right end portion of FIG. 2) of the sleeve 13b. The nut 13c is screwed to the rear end portion of the sleeve 13b, and abuts on the support ring 13a from the rear side. If the nut 13c is rotated to be moved to the front side of the jet engine 1, the support ring 13a moves to the front side according to the movement of the nut 13c. Accordingly, the taper surface 13a1 and the taper surface 13b1 slide on each other, and the support ring 13a is pushed toward the outside in the radial direction. Therefore, centering of the support ring 13a is performed, and centering of the sleeve 13b is also performed.

Figure 3A:
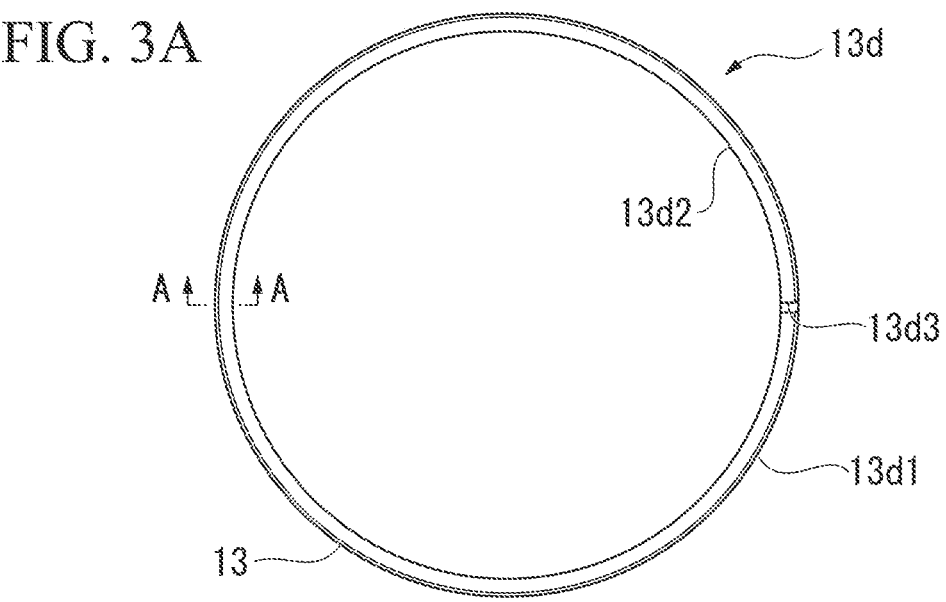
FIG. 3A is a front view of a spacer ring of the jet engine in the embodiment of the present disclosure.
Figure 3B:
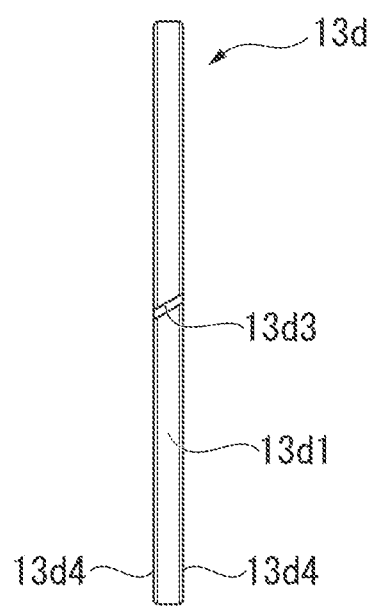
FIG. 3B is a side view of the spacer ring of the jet engine in the embodiment of the present disclosure.
Figure 3C:
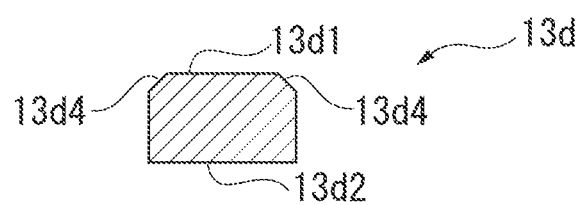
FIG. 3C is a sectional view taken along line A-A of FIG. 3A.

FIG. 3A is a front view of the spacer ring 13d, FIG. 3B is a side view of the spacer ring 13d, and FIG. 3C is a sectional view taken along line A-A of FIG. 3A. As shown in the drawings, the spacer ring 13d is an annular member which has a cut portion 13d3 which becomes a gap in the intermediate portion, and for example, is formed of a material having a high elastic modulus and superior wear resistance such as polytetrafluoroethylene, a polyimide resin, or the like.

An outer circumferential surface 13d1 of the spacer ring 13d is provided such that the width thereof is wide in the axial direction of the shaft 10, and has a shape along an inner wall surface 13b3 (that is, the surface 13b3 of the support portion 130) of the sleeve 13b in the axial direction of the shaft 10. In the present embodiment, the inner wall surface 13b3 of the sleeve 13b has a linear shape which is parallel to the axis of the shaft 10. Accordingly, the outer circumferential surface 13d1 of the spacer ring 13d also has a linear shape which is parallel to the axis of the shaft 10.

Similarly to the outer circumferential surface 13d1, an inner circumferential surface 13d2 of the spacer ring 13d is provided such that the width thereof is wide in the axial direction of the shaft 10, and has a shape along the bottom surface (that is, the outer wall surface 12a1 of the center bent tube 12) of the accommodation groove 12a in the axial direction of the shaft 10. In the present embodiment, the bottom surface of the accommodation groove 12a has a linear shape which is parallel to the axis of the shaft 10. Accordingly, the inner circumferential surface 13d2 of the spacer ring 13d also has a linear shape which is parallel to the axis of the shaft 10. Therefore, the outer circumferential surface 13d1 and the inner circumferential surface 13d2 of the spacer ring 13d are surfaces which are parallel to each other.

The thickness of the spacer ring 13d in the radial direction is set so as to exceed the depth of the accommodation groove 12a such that the outer circumferential surface 13d1 abuts on the inner circumferential surface of the sleeve 13b in a case where the inner circumferential surface 13d2 is disposed so as to abut on the bottom surface of the accommodation groove 12a. Accordingly, the spacer ring 13d is accommodated in the accommodation groove 12a and the outer circumferential surface 13d1 abuts on the inner circumferential surface of the sleeve 13b. Therefore, as shown in FIG. 2, a slight gap is formed between the center bent tube 12 and the sleeve 13b. That is, a slight gap is formed between the center bent tube 12 and the support portion 130.

The cut portion 13d3 cuts a portion of the spacer ring 13d, and as shown in FIG. 3B, and is linearly provided to be inclined to the axis of the shaft 10. The inclination angle of the cut portion 13d3 with respect to the axis of the shaft 10 is set such that the cut portion 13d3 does not penetrate the spacer ring 13d from the front side toward the rear side (outlet is not viewed) when viewed in the axial direction of the shaft 10 (that is, in the state shown in FIG. 3A). That is, when viewed in the axial direction of the shaft 10, the cut portion 13d3 is provided at the position at which the front end portion and the rear end portion of the cut portion 13d3 do not overlap each other.

Both ends of the outer circumferential surface 13d1 of the spacer ring 13d in the axial direction of the shaft 10 are chamfered, and chamfered portions 13d4 are formed. The chamfered portions 13d4 prevent corner portions of the spacer ring 13d from being caught by the inner circumferential surface of the sleeve 13b when the spacer ring 13d slides on the inner circumferential surface of the sleeve 13b.

In the jet engine 1 of the present embodiment having the above-described configuration, a portion of the air supplied by the rotation of the fan 4 is two-stage compressed by the low-pressure compressor 5 and the high-pressure compressor 6. The generated compressed air and a fuel are combusted by the combustor 7, and a combustion gas is generated. The combustion gas passes through the high-pressure turbine 8 and the low-pressure turbine 9 to rotate the shaft 10 and is ejected from the main nozzle 11 toward the rear side, and a thrust is obtained. The center bent tube 12 discharges air including a lubricant to the main nozzle 11.

Since the distal end of the center bent tube 12 is fixed to the first shaft 10a, the center bent tube 12 is rotated according to the rotation of the shaft 10. In this case, since the center bent tube 12 is slidably supported by the position regulation mechanisms 13, a great stress is not applied locally to the center bent tube 12, and the center bent tube 12 is regulated at the position corresponding to the axis of the shaft 10.

In the jet engine 1 of the present embodiment, a cut portion 13d3 in which a portion of the spacer ring 13d is cut is provided. Accordingly, when the spacer ring 13d is attached to the center bent tube 12, it is possible to deform the spacer ring 13d such that the diameter of the spacer ring 13d increases with the cut portion 13d3 as a boundary. Therefore, the spacer ring 13d can be formed of a material having a high elastic modulus, and for example, it is possible to select a hard material having wear resistance such as polytetrafluoroethylene, a polyimide resin, or the like as a material for forming the spacer ring 13d. By using the spacer ring 13d having the above-described material, when the center bent tube 12 to which the spacer ring 13d is attached is inserted into the first shaft 10a in which the support portion 130 (that is, the support ring 13a, the sleeve 13b, and the nut 13c) is provided, it is possible to prevent the spacer ring 13d from being caught by the sleeve 13b, and it is possible to easily perform the attachment operation of the center bent tube 12. In addition, it is possible to prevent the spacer ring 13d from being worn due to use for a long time. In addition, since the spacer ring 13d is not easily worn and deformed, it is possible to prevent the center bent tube 12 and the sleeve 13b from coming into contact with each other.

In addition, according to the jet engine 1 of the present embodiment, the spacer ring 13d includes the outer circumferential surface 13d1 which has the shape along the inner wall surface 13b3 of the sleeve 13b in the axial direction of the shaft 10 and the inner circumferential surface 13d2 which has the shape along the outer wall surface 12a1 of the center bent tube 12 in the axial direction of the shaft 10. Accordingly, the spacer ring 13d can come into contact with the sleeve 13b and the center bent tube 12 with a wide area. Therefore, it is possible to prevent a great pressing force from being applied locally to the spacer ring 13d which is interposed between the sleeve 13b and the center bent tube 12, and it is possible to uniformize a deformation amount in the circumferential direction of the spacer ring 13d. Accordingly, it is possible to prevent a difference of compression amounts of the spacer ring 13d in the circumferential direction from occurring, and it is possible to reliably perform centering of the center bent tube 12.

In addition, in the jet engine 1 of the present embodiment, both ends of the outer circumferential surface 13d1 of the spacer ring 13d in the axial direction of the shaft 10 are chamfered. Accordingly, it is possible to prevent corner portions of the spacer ring 13d from being caught by the inner circumferential surface of the sleeve 13b, and it is possible to more easily perform the attachment operation of the center bent tube 12.

Moreover, in the jet engine 1 of the present embodiment, the cut portion 13d3 of the spacer ring 13d is linearly provided to be inclined to the axis of the shaft 10. Accordingly, it is possible to remove locations at which the outer circumferential surface 13d1 and the sleeve 13b do not come into contact with each other at all in the circumferential direction of the spacer ring 13d. That is, even in the region in which the cut portion 13d3 is provided, at least a portion of the spacer ring 13d abuts on the sleeve 13b in the axial direction of the shaft 10. Accordingly, the spacer ring 13d abuts on the sleeve 13b over the entire circumference, and it is possible to more reliably perform the centering of the center bent tube 12.

In addition, in the jet engine 1 of the present embodiment, in the accommodation groove 12a which is provided in the center bent tube 12, the wall surfaces 12b facing each other in the axial direction of the shaft 10 are disposed with a gap with respect to the spacer ring 13d. Accordingly, even in a case where the spacer ring 13d is interposed between the center bent tube 12 and the sleeve 13b and is compressed and deformed, it is possible to prevent the spacer ring 13d and the wall surfaces 12b of the accommodation groove 12a from coming into contact with each other, and the entire spacer ring 13d is uniformly compressed. Therefore, it is possible to more reliably perform the centering of the center bent tube 12. In addition, the spacer ring 13d can basically move in the circumferential direction and the axial direction of the center bent tube 12 in the accommodation groove 12a. However, the spacer ring 13d which is an elastic body always presses the outer circumference of the center bent tube 12 (accommodation groove 12a). Accordingly, if an external force is applied to the spacer ring 13d in the circumferential direction or the axial direction of the center bent tube 12, since a static friction force generated from the pressing force (normal force) resists the external force, in general, the spacer ring 13d does not move. However, the spacer ring 13d slightly moves in the circumferential direction or the axial direction of the center bent tube 12 only in a case where the external force exceeds the static friction force. However, the spacer ring 13d does not come into contact with the wall surfaces 12b of the accommodation groove 12a due to the above-described gap.

Hereinbefore, a preferred embodiment of the present disclosure is described with reference to the drawings. However, the present disclosure is not limited to the embodiment. The shapes of the components shown in the above-described embodiment or the combination thereof are exemplified, and various modifications may be applied to the embodiment based on design requirement within a scope of the present disclosure.

In addition, in the present embodiment, the configuration in which the cut portion 13d3 is linearly provided is described. However, the present disclosure is not limited to this, and the cut portion 13d3 may be provided to be bent or curved.

Moreover, in the above-described embodiment, the configuration in which the chamfered portions 13d4 are provided only on the outer circumferential surface 13d1 is described. However, the present disclosure is not limited to this, and the chamfered portion may be also provided on the inner circumferential surface 13d2.

Moreover, in the above-described embodiment, the example in which two position regulation mechanisms 13 are provided is described. However, the present disclosure is not limited to this, and one position regulation mechanism 13 or three or more position regulation mechanisms 13 may be provided.

INDUSTRIAL APPLICABILITY

According to the jet engine of the present disclosure, in the jet engine which includes the center bent tube, it is possible to easily perform the attachment operation of the center bent tube, and it is possible to more accurately perform centering of the center bent tube.

What is claimed is:

1. A jet engine, comprising:
   a hollow shaft;
   a center bent tube which is inserted into the shaft;
   an annular support portion which protrudes from an inner wall surface of the shaft; and
   an annular spacer ring which is provided on an outer wall surface of the center bent tube and slidably abuts on the support portion,
   wherein the spacer ring includes an outer circumferential surface which has a shape along a surface of the support portion in an axial direction of the shaft, an inner circumferential surface which has a shape along the outer wall surface of the center bent tube in the axial direction of the shaft, and a cut portion in which a portion of the spacer ring is cut, and
   wherein both ends of the outer circumferential surface of the spacer ring in the axial direction of the shaft are chamfered.

2. The jet engine according to claim 1,
   wherein the cut portion is linearly provided to be inclined to the axis of the shaft.

3. The jet engine according to claim 2,
   wherein the center bent tube includes an annular accommodation groove in which the spacer ring is accommodated, and
   wherein wall surfaces of the accommodation groove facing each other in the axial direction of the shaft are disposed with a gap with respect to the spacer ring.

4. The jet engine according to claim 1,
   wherein the center bent tube includes an annular accommodation groove in which the spacer ring is accommodated, and
   wherein wall surfaces of the accommodation groove facing each other in the axial direction of the shaft are disposed with a gap with respect to the spacer ring.

5. The jet engine according to claim 1,
   wherein a gap is formed between the center bent tube and the support portion.

* * * * *